United States Patent

Burckhardt et al.

[11] 3,762,774
[45] Oct. 2, 1973

[54] BRAKE FORCE CONTROL SYSTEM FOR VEHICLES ESPECIALLY MOTOR VEHICLES

[75] Inventors: Manfred H. Burckhardt, Waiblingen; Hellmut Krohn, Esslingen; Horst Grossner, Geradstetten; Hans-Jörg Florus, Goppingen, all of Germany

[73] Assignee: Damiler-Benz Aktiengesellschaft, Stuggart-Unterturk-heim, Germany

[22] Filed: July 13, 1971

[21] Appl. No.: 162,110

[30] Foreign Application Priority Data
July 14, 1970 Germany................... P 20 34 809.8

[52] U.S. Cl............ 303/21 EB, 188/181 C, 303/20, 303/21 BE, 303/21 AF, 324/160–161
[51] Int. Cl. .............................. B60t 8/08, B60t 8/10
[58] Field of Search................... 188/181 C; 303/20, 303/21; 317/5; 318/52; 340/263

[56] References Cited
UNITED STATES PATENTS

| | | | |
|---|---|---|---|
| 3,640,589 | 2/1972 | Taniguchi....................... | 303/21 BE |
| 3,245,213 | 4/1966 | Thompson et al............... | 303/21 EB |
| 3,650,575 | 3/1972 | Okamoto........................ | 303/21 CF |
| 3,663,070 | 5/1972 | Scharlack....................... | 303/21 P |
| 3,260,555 | 7/1966 | Packer............................ | 303/21 EB |
| 3,583,773 | 6/1971 | Steinbrenner et al. .......... | 303/21 EB |
| 3,620,576 | 11/1971 | Wehde et al.................... | 303/21 BE |

*Primary Examiner*—Duane A. Reger
*Assistant Examiner*—Stephen G. Kunin
*Attorney*—Craig et al.

[57] ABSTRACT

A brake force control system for vehicles, especially for motor vehicles, in which a sensing device is coordinated to each wheel for determining its rotating condition, whose signals influence the brakes when exceeding or falling below certain threshold values and when compared with a reference magnitude which is derived from the wheel rotating the fastest; a second reference magnitude of similar type replaces the first reference magnitude when the latter fails or drops below a predetermined value whereby the second reference magnitude proceeds according to a first differential quotient corresponding to a deceleration of the wheel equal to at least 1 g.

10 Claims, 2 Drawing Figures

PATENTED OCT 2 1973 3,762,774

INVENTORS
MANFRED H. BURCKHARDT
HELLMUT KROHN
HORST GROSSNER
HANS-JÖRG FLORUS

BY Craig, Antonelli & Hill

ATTORNEYS

BRAKE FORCE CONTROL SYSTEM FOR VEHICLES ESPECIALLY MOTOR VEHICLES

The present invention relates to a brake force control system for vehicles, especially for motor vehicles, whereby a feeler or sensing means is coordinated to each wheel for the determination of its rotary condition, whose signals influence the brakes upon exceeding or falling below predetermined threshold values and upon comparison with a reference magnitude given by the wheel rotating the fastest.

With the known brake force control systems of the aforementioned type, a maximum voltage is derived from the signals of all vehicle wheels which corresponds to the most rapidly rotating wheel and which constitutes the aforementioned reference magnitude. This prior art arrangement, however, fails under certain operating conditions. More particularly, if, for example, during a sudden transition onto a road surface with very slight friction value, all wheels block, then the maximum voltage collapses or falls below a predetermined value so that no reference value or magnitude is present any longer. Under these circumstances, the brake force control must also fail because the brake force can no longer be reduced and consequently, no re-acceleration of the wheels occurs. This means therefore in practice that the locked condition of the wheels remains preserved against all intentions.

The present invention is concerned with the task to avoid the described disadvantages. An installation is therefore to be produced according to the present invention which makes it possible also during the failure of the reference magnitude or during the decrease thereof below a predetermined value to re-accelerate the wheels, which means therefore to bring the brake force control system back into response.

The underlying problems are solved in the brake force control systems of the aforementioned type in that a second reference magnitude of similar type is provided which replaces the first reference magnitude when the first reference magnitude fails completely or decreases below a predetermined value and in that the second reference magnitude proceeds according to a first differential quotient corresponding to a deceleration of at least 1 g. Under the term "similar type" is thereby to be understood that the second reference magnitude corresponds in its dimension to the first, i.e., this means if a voltage is used — as, for example, mentioned above — as the first reference magnitude, then the second reference magnitude is also to be represented as voltage.

The brake force control system according to the present invention offers the advantage that it enables in every case, i.e., also under the operating conditions described above, an orderly signal transmission to the control devices of the brake force control system. It is possible in this manner in every case to re-accelerate the wheels out of the locked condition, which means the brake force control remains completely operable also under the described operating conditions.

The present invention prefers a solution according to which a condenser is adapted to be rapidly charged with the maximum voltage serving as first reference magnitude and formed in a conventional manner whereby the condenser is discharged in a defined manner with a constant current. This has as a consequence that in the presence of the maximum voltage, the latter takes over the signal transmission and the control of the brake force control devices. If this maximum voltage falls below a predetermined value or fails altogether, then the voltage corresponding to the constant discharge current of the condenser takes over the signal transmission and the control of the brake force control devices. The signals are thereby all processed correspondingly by a conventional electronic system and are fed as electrical control magnitude to the control devices, for example, to conventional magnetic valves.

In one embodiment according to the present invention, the condenser is adapted to be discharged by way of a transistor with constant base voltage. This constant base voltage could be produced by a conventional voltage divider with the aid of resistances. However, since such a voltage divider merely keeps constant the voltage ratio but not the absolute voltage, which means therefore that during a decrease or fluctuations of the provided supply (battery) voltage, it also fluctuates or decreases in the ratio of its voltage division, the present invention additionally proposes that the constant base voltage at the transistor is produced by diodes. A temperature compensation is thereby achieved simultaneously. Two or even more, series-connected diodes, may thereby be used according to the present invention.

A futher feature of the present invention resides in that a resistance matched to the diodes and the magnitude of the discharge current is arranged as negative feedback in the emitter circuit.

According to a further development of the inventive concept, the signal pick-up at the condenser takes place currentlessly, for example, by means of an impedance converter. In this manner, an additional discharge of the condenser is avoided. Consequently, the maximum voltage (first reference magnitude) or the voltage corresponding to the constant discharge current of the condenser (second reference magnitude) is therefore available at the output of the impedance converter for the further processing in the electronic circuit already mentioned above and otherwise of conventional construction.

Accordingly, it is an object of the present invention to provide a brake force control system for vehicles, expecially for motor vehicles, which avoids in an effective and operationally reliable manner, the aforementioned shortcomings and drawbacks encountered in the prior art.

Another object of the present invention resides in a brake force control system for motor vehicles which assures continued proper operation of the brake force control system even if the variable reference voltage formed by the wheel rotating fastest either drops below a predetermined value or completely fails.

A further object of the present invention resides in a brake force control system for motor vehicles which increases the safety of operation, yet is simple in construction and relatively inexpensive.

These and further objects, features and advantages of the present invention will become more obvious from the following description when taken in connection with the accompanying drawing which shows, for purposes of illustration only, one embodiment in accordance with the present invention, and wherein.

Figure 1:
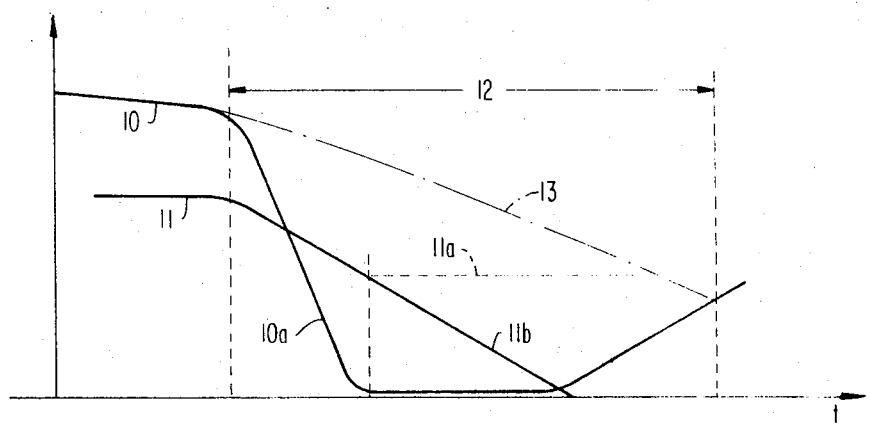
FIG. 1 is a diagram explanatory of the operation of the present invention.

Referring now to the drawing and more particularly to FIG. 1, the curve of the first reference magnitude, which means in this case the maximum voltage is illustrated by the curve 10 related to a wheel — which in this case at the same time represents the wheel rotating the fastest. During the braking, this maximum voltage decreases correspondingly. If the respective wheel now locks, then a very steep decrease of this maximum voltage results — represented by the curve portion 10a — which may collapse even to zero. In that case, by reason of the missing signal transmission, the brake medium pressure — which is illustrated by the curve 11 — would remain constant corresponding to the curve portion 11a, i.e., a re-acceleration of the wheel would not be possible any longer. Consequently, the wheel would remain in the locked condition.

In order to avoid this, the first reference magnitude is replaced within the range 12, i.e., therefore in the range in which it collapses or drops below a predetermined value, by a second reference magnitude — again represented as voltage — which is so selected that it corresponds to a brake deceleration of at least 1 g. Smaller values than 1 g. are not utilizable because the normal braking capability with a high friction value between the road surface and the wheels then cannot be utilized. Considerably higher values than 1 g., for example, 10, 20 or even more g's are not utilizable because, in that case, also the second reference magnitude would result in an excessively steep decrease and therefore the aimed-at effect could not be achieved.

In the indicated range 12, the second reference magnitude now takes over signal transmission in lieu of the collapsed or excessively small first reference magnitude. This means that the brake medium pressure is further decreased corresponding to the curve portion 11b and the wheel can be brought again into rolling contact with the road surface and can again be re-accelerated correspondingly. Consequently, the brake force control system remains fully effective also in this range.

Figure 2:
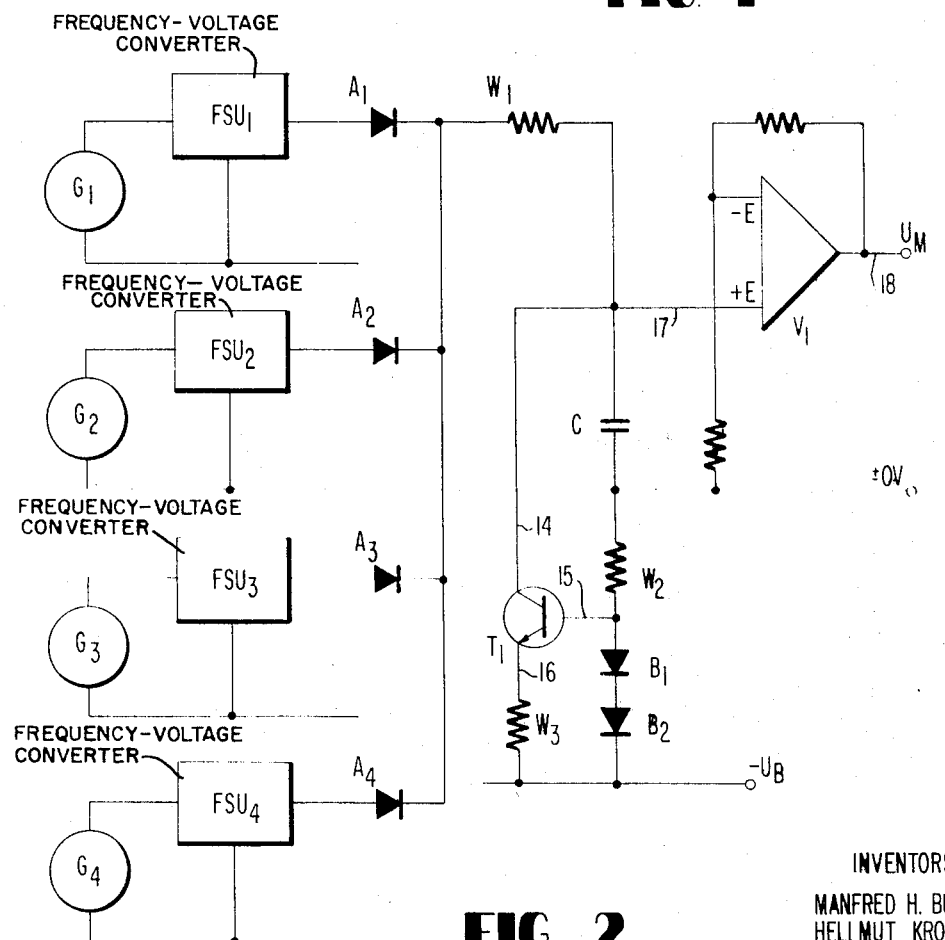
FIG. 2 is a block diagram of one embodiment of a brake force control system in accordance with the present invention.

According to FIG. 2, a signal transmitter, in this case, a frequency transmitter $G_1$ to $G_4$ is coordinated to each wheel. The maximum reference voltage is realized from the signals of these frequency transmitters in a conventional manner by way of the frequency-voltage converters $FSU_1$ to $FSU_4$ and the diodes $A_1$ to $A_4$. This maximum voltage (first reference magnitude) is fed by way of a resistance $W_1$ to a condenser C. The time constant constituted by the resistance $W_1$ and the condenser C is very small so that the voltage is always available at the condenser C with a very small, but defined delay, which voltage corresponds to the most rapidly rotating wheel, i.e., therefore to the maximum voltage.

The discharge of the condenser C takes place over the line 14 by way of a transistor $T_1$ with a constant (distinct) current. This constant discharge current is achieved in the transistor $T_1$ by a constant base voltage. For that purpose, a type of voltage divider, consisting of the resistance $W_2$ and the two series-connected diodes $B_1$ and $B_2$ is applied to the base 15 of the transistor $T_1$. The diodes $B_1$ and $B_2$ are selected because — in contrast to a resistance — they determine not only the voltage ratio of a voltage divider but also the absolute value of the voltage in their section of the voltage divider. Depending on the desired voltage, also more than two series-connected diodes may be used at this place. A temperature compensation is achieved simultaneously by means of these diodes, i.e., the voltage is independent of temperature fluctuations.

A resistance $W_3$ is arranged in the emitter circuit 16 of the transistor $T_1$. This resistance $W_3$ is matched to the diodes $B_1$, $B_2$ and to the magnitude of the desired discharge current. It serves simultaneously as negative feedback.

The constant discharge current of the condenser C effects a rigorously linear decrease of the condenser voltage (second reference magnitude). The magnitude of the discharge current takes place — as already mentioned — in such a manner that the decrease of the condenser voltage versus time corresponds to a tangential deceleration of the wheel of 1 g.

In order to avoid an additional discharge of the condenser C, the condenser voltage is fed by way of a line 17 to a conventional impedance converter $V_1$ which represents an operational amplifier with a high-ohmic input impedance and serves as a noinverting amplfiier and with a small output impedance. The maximum voltage (first reference magnitude) or the voltage corresponding to the linearly decreasing condenser voltage (second reference magnitude) is therefore available at the output 18 of the impedance converter $V_1$. These magnitudes are further processed by an electronic circuit of conventional construction and are supplied as control signals to the control devices, for example, to the magnetic valves. Since the electronic circuit processing these control signals are known as such, and are formed by commercially available logic circuit elements, a detailed description thereof is dispensed with herein.

The operation of the installation according to the present invention has already been described hereinabove by reference to FIG. 1.

While we have shown and described only one embodiment in accordance with the present invention, it is understood that the same is not limited thereto but is susceptible of numerous changes and modificcations as known to those skilled in the art, and we therefore do not wish to be limited to the details shown and described herein but intend to cover all such changes and modifications as are encompassed by the scope of the appended claims.

We claim:

1. A brake force control system for vehicles, especially for motor vehicles in which a sensing means is co-ordinated to each wheel for determining its rotating condition and in which the signals of the sensing means upon exceeding or falling below a predetermined threshold value and upon comparison with a reference magnitude produced by the wheel rotating the fastest, influence the brakes of the vehicle, characterized by means producing a second reference magnitude of similar type which replaces the first reference magnitude when the first reference magnitude either fails completely or decreases below a predetermined value, and in that the second reference magnitude proceeds according to a first differential quotient corresponding substantially to a deceleration of at least about 1 g, said means including a condenser means adapted to be rapidly charged by the maximum voltage serving as the first reference magnitude, said condenser means being discharged in a controlled manner with a substantially constant current, a substantially currentless signal pick-up means at the condenser means, and an impedance converter for the signal pick-up means at the condenser.

2. A brake force control system according to claim 1, characterized in that said means produces said second reference magnitude from said first reference magnitude.

3. A brake force control system according to claim 1, characterized in that the condenser means is adapted to be discharged by way of a transistor with constant base voltage.

4. A brake force control system according to claim 3, characterized in that the constant base voltage at the transistor is produced by diode means.

5. A brake force control system according to claim 4, characterized in that a resistance means is arranged in the emitter circuit of the transistor as negative feedback which is substantially matched to the diode means and to the magnitude of the discharge current.

6. A brake force control system for vehicles, especially for motor vehicles in which a sensing means is co-ordinated to each wheel for determining its rotating condition and in which the signals of the sensing means upon exceeding or falling below a predetermined threshold value and upon comparison with a reference magnitude produced by the wheel rotating the fastest, influence the brakes of the vehicle, characterized by means producing a second reference magnitude of similar type which replaces the first reference magnitude when the first reference magnitude either fails completely or decreases below a predetermined value, said means including a condenser means adapted to be rapidly charged by the maximum voltage serving as the first reference magnitude, said condenser means being discharged in a controlled manner with a substantially constant current, and substantially currentless signal pick-up means including an impedance converter for picking-up the signal at said condenser means.

7. A brake force control system according to claim 6, characterized in that said impedance transformer is an operational amplifier connected as a noninverting amplifier.

8. A brake force control system according to claim 6, characterized in that the condenser means is adapted to be discharged by way of a transistor with constant base voltage.

9. A brake force control system according to claim 6, characterized in that the constant base voltage at the transistor is produced by diode means.

10. A brake force control system according to claim 6, characterized in that a resistance means is arranged in the emitter circuit of the transistor as negative feedback which is substantially matched to the diode means and to the magnitude of the discharge current.

* * * * *